(12) United States Patent
Drane et al.

(10) Patent No.: US 8,097,805 B2
(45) Date of Patent: Jan. 17, 2012

(54) PIVOTING WHILE-IN-USE ELECTRICAL BOX AND COVER

(75) Inventors: Mark R. Drane, Germantown, TN (US);
Cong T. Dinh, Collierville, TN (US);
Joey D. Magno, Jr., Cordova, TN (US);
Robert Kevin Jolly, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 258 days.

(21) Appl. No.: 12/630,201

(22) Filed: Dec. 3, 2009

(65) Prior Publication Data
US 2010/0147547 A1      Jun. 17, 2010

Related U.S. Application Data

(60) Provisional application No. 61/121,710, filed on Dec. 11, 2008.

(51) Int. Cl.
*H01J 5/00* (2006.01)
(52) U.S. Cl. ............... 174/50; 174/58; 174/60; 174/66; 439/535; 248/906
(58) Field of Classification Search .......... 174/50, 174/58, 60, 66, 67; 439/535; 248/906; 220/4.02, 220/241, 242
See application file for complete search history.

(56) References Cited

U.S. PATENT DOCUMENTS

| | | | | |
|---|---|---|---|---|
| 3,432,611 | A * | 3/1969 | Gaines et al. | 174/66 |
| 3,437,738 | A * | 4/1969 | Wagner | 174/55 |
| 3,544,703 | A * | 12/1970 | Jones | 174/66 |
| D231,896 | S | 6/1974 | Zerwes | |
| 3,895,179 | A * | 7/1975 | Wyatt | 174/50 |
| 4,102,466 | A | 7/1978 | Jadatz | |
| 4,291,818 | A | 9/1981 | Nozawa et al. | |
| 4,979,634 | A | 12/1990 | Begley | |
| 5,362,924 | A | 11/1994 | Correnti | |
| D395,283 | S | 6/1998 | Monaco et al. | |
| D400,507 | S | 11/1998 | Monaco | |
| D411,826 | S | 7/1999 | Lamar et al. | |
| D529,447 | S | 10/2006 | Greenfield | |
| D531,961 | S | 11/2006 | Greenfield | |
| 7,241,952 | B2 | 7/2007 | Dinh | |
| 7,619,163 | B1 * | 11/2009 | Shotey et al. | 174/67 |
| 7,795,533 | B2 * | 9/2010 | Bravo et al. | 174/50 |
| 7,855,338 | B2 * | 12/2010 | Troder | 174/50 |
| 7,872,196 | B2 * | 1/2011 | Harada | 174/50 |

* cited by examiner

*Primary Examiner* — Dhiru R Patel
(74) *Attorney, Agent, or Firm* — Hoffmann & Baron, LLP

(57) ABSTRACT

The present invention is directed to a "while-in-use" electrical box device including an electrical box housing and pivotable cover which function as an integral unit and rotate on a fixed frame.

20 Claims, 8 Drawing Sheets

PIVOTING WHILE-IN-USE ELECTRICAL BOX AND COVER

CROSS REFERENCE TO RELATED APPLICATIONS

This application claims priority to U.S. Provisional Patent Application No. 61/121,710 filed on Dec. 11, 2008, the contents of which is incorporated herein by reference in its entirety.

FIELD OF THE INVENTION

The present invention relates generally to a box for housing electrical termination devices such as jacks and receptacles. More particularly, the present invention relates to an electrical box with a pivotable cover member.

BACKGROUND OF THE INVENTION

Electrical boxes and housings are typically used to house electrical termination devices such as electrical receptacles and data/communication jacks which terminate wires running thereinto. These termination devices are provided so as to permit connection of electrical wires and cables terminated by complimentary termination devices such as plugs and the like.

With many electrical boxes, especially those which are used to house termination devices positioned within a floor or wall, it is desirable to construct the box to provide easy access for inserting the plug yet is not interfering.

A typical exterior electrical box has a cover which is pivoted to an open position to reveal the various power and signal components which are terminated therein. If covered, the user must open the cover, pull the plug into the box, locate the receptacle, and properly align and connect the plug to the receptacle in the confined space of the box. All this occurs with minimal viewing ability to assist in confirming the connection without damage or injury. Conventional covers open perpendicularly, approximately 90° from the horizontal disposition of the wall-mounted receptacles. This limitation on cover travel results from ease of manufacture, spring tension, weather protection and/or because the cover of a recessed box abuts the housing frame.

It is, therefore, desirable to provide an electrical box assembly which provides a cover opening to an obtuse angle, allowing for easy access and viewability of the receptacle and connections therein, while still affording protection from precipitation when the cover is open.

SUMMARY OF THE INVENTION

The present invention is directed to a "while-in-use" electrical box device with a pivotably opening cover formed with an asymmetric channel proximally disposed to the axis. A pair of flanged pins is affixed to the cover at opposite sides of the axis to pivot in weatherproof receiving sockets. This channel or indent is angled so as to permit the cover to receive the trim or locking frame portion of the electrical box, thereby opening upward to an obtuse angle relative to the position of the cover when closed. This configuration enhances visibility and accessibility to the power receptacles housed within the electrical box, particularly when configured with the receptacles fixed to the box housing, with only the cover pivotably opening. The cover depends perpendicularly from the plane of the receptacle in the closed position with an embrasure in the housing communicating with an embrasure in the locking frame to provide clearance for cords to extend downward from the receptacles. Detents in the cover and housing assist retaining the cover in the open or closed positions. An angular removable back wall with knockout ports facilitates connection from the source power supply and forms an area for cords to bend. A rear frame holds the assembly together in a flush mounting arrangement.

In the preferred embodiment receptacles are affixed to the inside front cover of the box instead of inside the box housing, thereby pivoting with the cover to the open position to face upwards for ease of use. At least one flanged pin includes an annular opening therethrough communicating with the interior of the cover. This opening acts as a bushing through which wires may pass through the cover wall without abrasion to energize the receptacles. An electric terminal mounted to the housing wall provides strain relief to the power supply wires. The depending cover extends outward in the open position such that it extends sufficiently when open to shield the upward facing receptacles from precipitation.

Additionally, the present invention provides an electrical box assembly including a box having an upper wall, interior side walls, exterior side walls, interior back wall, exterior lower wall, an exterior back wall and an open front face. The interior side walls and the exterior side walls are spaced apart and extend from the upper wall. The interior back wall extends from the upper wall. Also, the interior back wall extends between the interior side walls. The exterior back wall extends between the exterior side walls. Further, the exterior back wall extends between the upper wall and the exterior lower wall. The open front face is defined by the interior side walls, the interior back wall and the upper wall. The open front face has a perpendicular flange extending about a perimeter of the open front face. The box has an interior cavity defined by the interior side walls, the interior back wall, the upper wall and the open front face. The assembly further includes a cover pivotally attached to the box. The cover has an open position and a closed position. The cover seats within the interior cavity when the cover is in the closed position. The cover includes a pair of cover side walls, cover back wall, cover top wall and cover front wall. The cover front wall includes a concaved channel therein. The concaved channel provides an cavity for receiving the flange of the box when the cover is in the open position.

DETAILED DESCRIPTION OF THE PREFERRED EMBODIMENT

FIGS. 1-9 show the present invention is directed to an outdoor electrical box assembly including an electrical box housing and a cover which function as an integral unit and rotate in a fixed frame. The box assembly is recessed into a wall. The cover includes a recess to allow upward rotation of the cover a minimum of about 125 degrees. Rotating the integral box and cover upwardly allows user to easily see the electrical device when inserting a power plug. Once the plug is inserted the integral box and cover are rotated down vertically and snapped closed.

Figure 1:
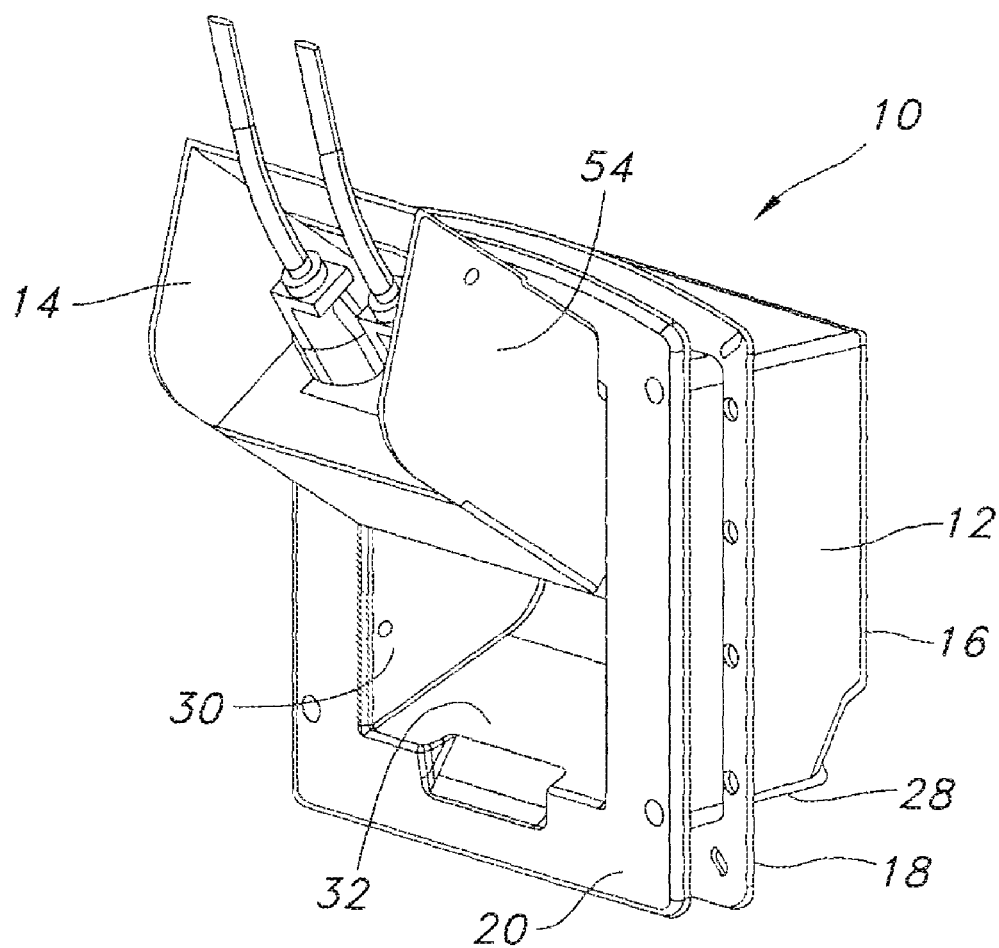
FIG. 1 is an isometric showing of the electrical box assembly of the embodiment with the receptacle pivoting with the cover in the open position.
Figure 2:
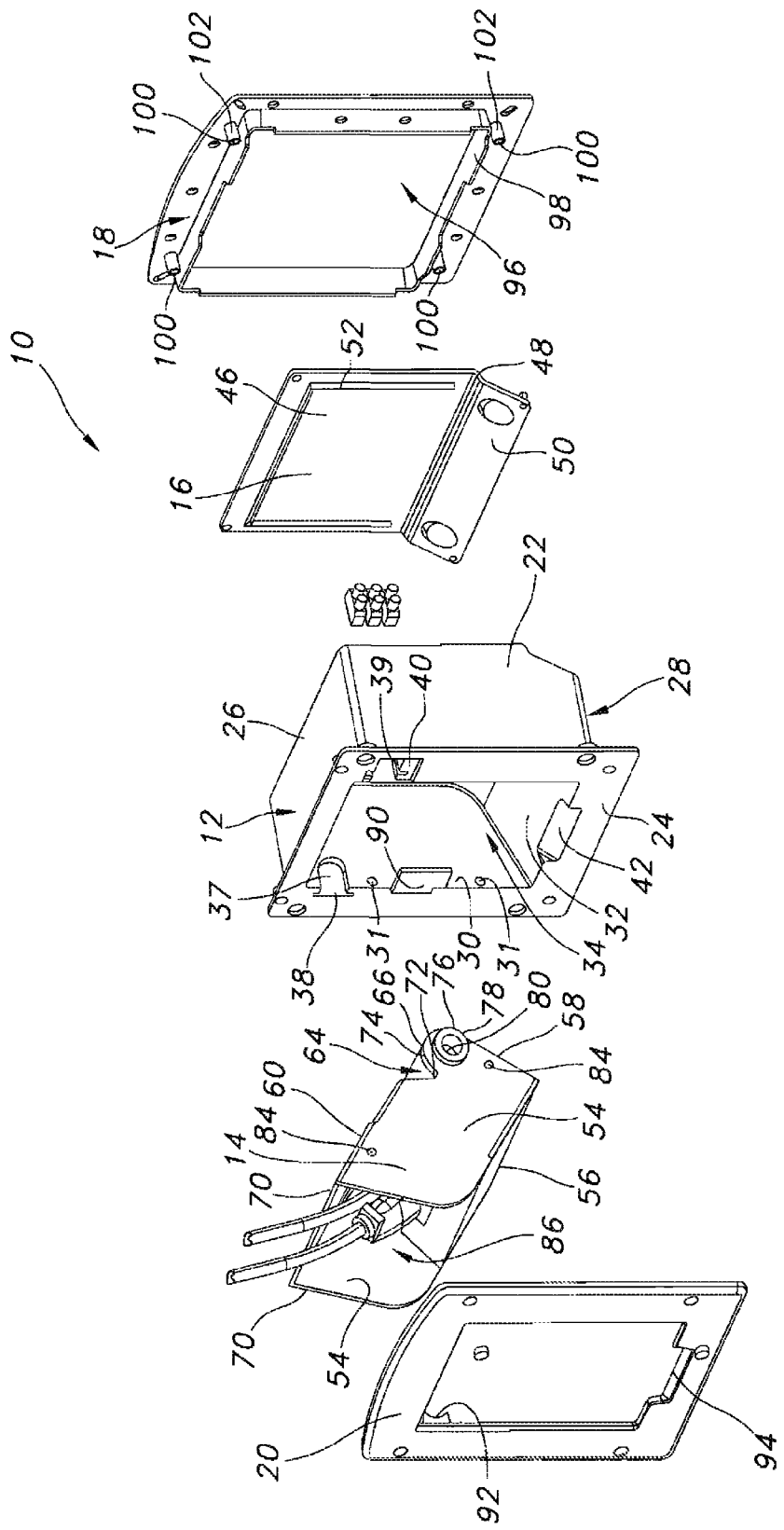
FIG. 2 is a an exploded view of the electrical box assembly of FIG. 1 showing the pivoting cover in the fully open position with power cords connected to the receptacle disposed within the cover.
Figure 3:
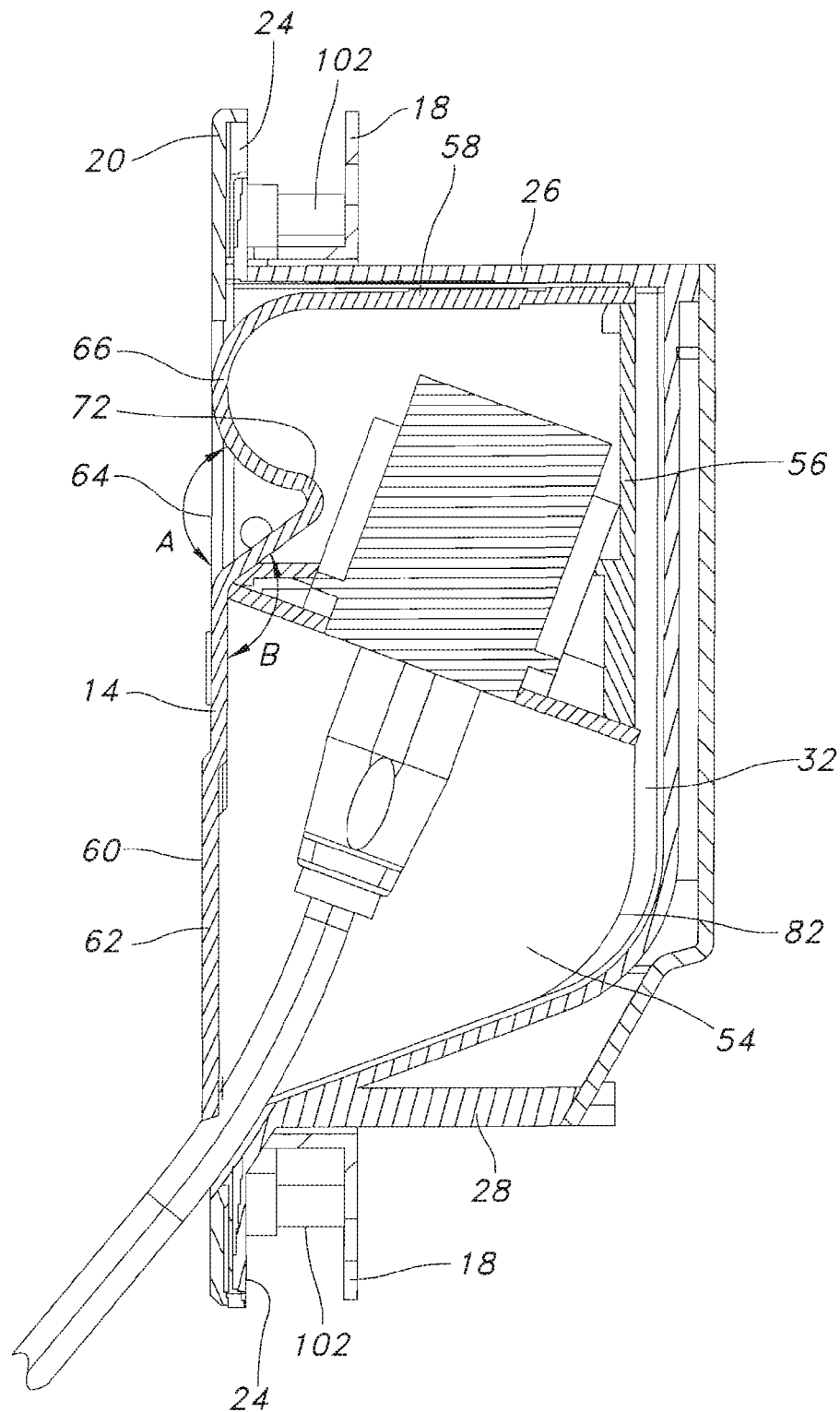
FIG. 3 is a side sectional view of the electrical box assembly of FIG. 1 showing the cover in the closed position with a power cord engaged with the receptacle.

Referring now to FIGS. 1-3, the electrical box assembly 10 of the present invention is shown. Box assembly 10 includes an electrical box housing 12, a pivoting cover 14 a removable back wall 16, a back frame 18 and a locking frame 20.

Box housing 12 is generally square with a double wall construction to provide an interior cavity for cover 14 to seat and an exterior cavity between the double walls to provide a cavity for the electrical and terminal equipment to seat. The box housing 12 includes an upper wall 26 attached to exterior walls and interior walls. The exterior walls include exterior side wall 22 and exterior lower wall 28. The interior walls include interior side walls 30 and interior back wall 32. The pair of exterior side walls 22 is rectangular with a back corner of the rectangle cut-off. One edge of the exterior side walls 22 is attached to a substantially planar inner flange 24 which extends perpendicular from the exterior side walls 22. The pair of exterior side walls 22 is attached to an upper side wall 26. The upper wall 26 is generally rectangular in shape and has four edges. Each edge is attached perpendicularly to extending members, such as exterior side walls 22, flange 24 or back wall 16. The attachment point between the exterior side walls 22 and the upper wall 26 includes channels with holes to provide for attachment of the removable back wall 16 to the remaining box housing 12. Exterior lower wall 28 is generally rectangular and is attached on two opposing edges by the exterior side walls 22. At the joint where the exterior lower wall 28 edge and each exterior side wall 22 edge meets is a channel including a hole which provides a means of attaching the removable back wall 16 to the remaining box housing 12. The exterior lower wall 28 is also attached to the flange 24 which extends perpendicular to the exterior lower wall 28. In this embodiment, the exterior lower wall 28 is shorter than the upper wall 26 which accommodates the geometry of the back wall 16.

Figure 4:
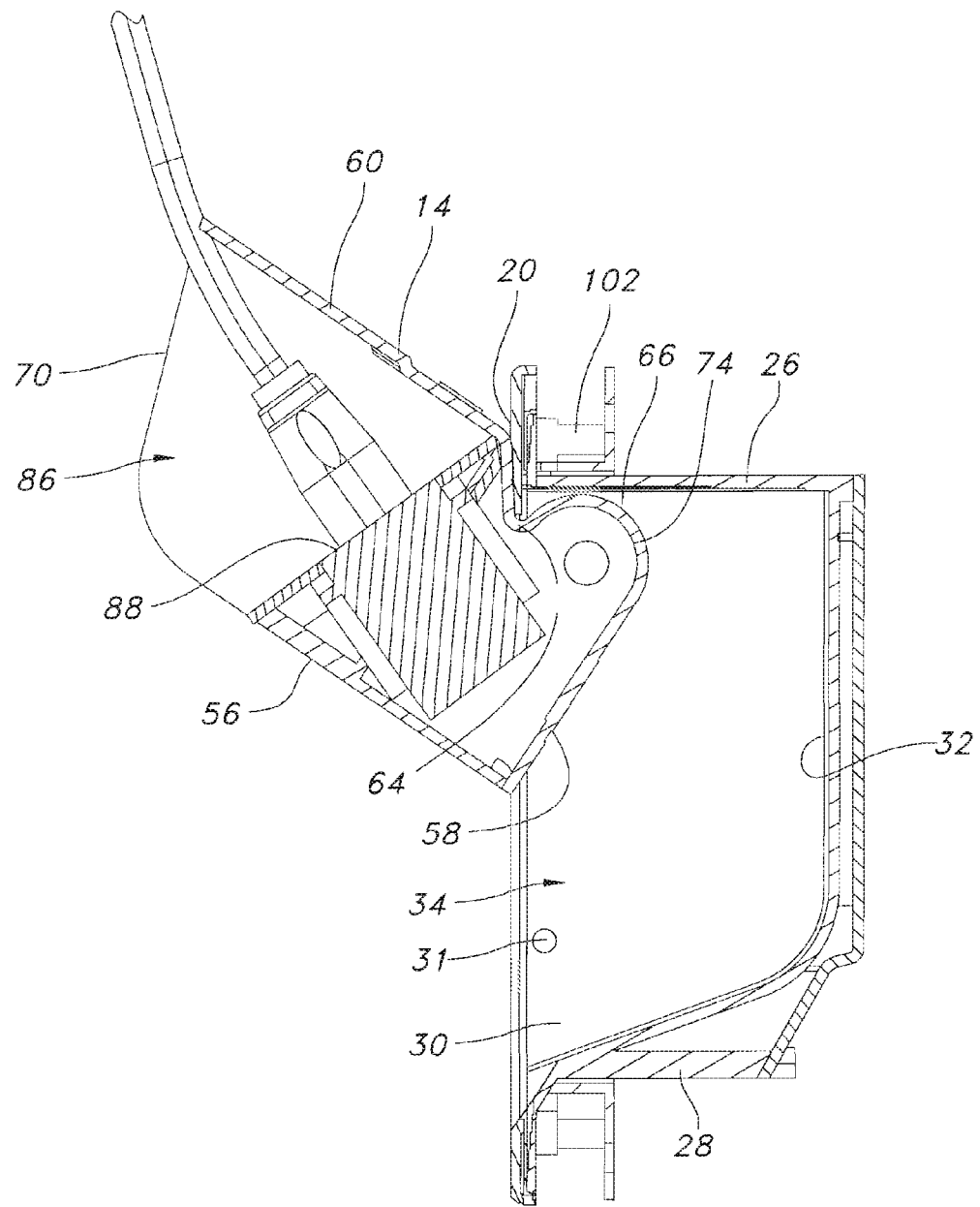
FIG. 4 is a side sectional view of the electrical box assembly of FIG. 1 showing the cover in the open position with a power cord engaged with the receptacle.
Figure 5:
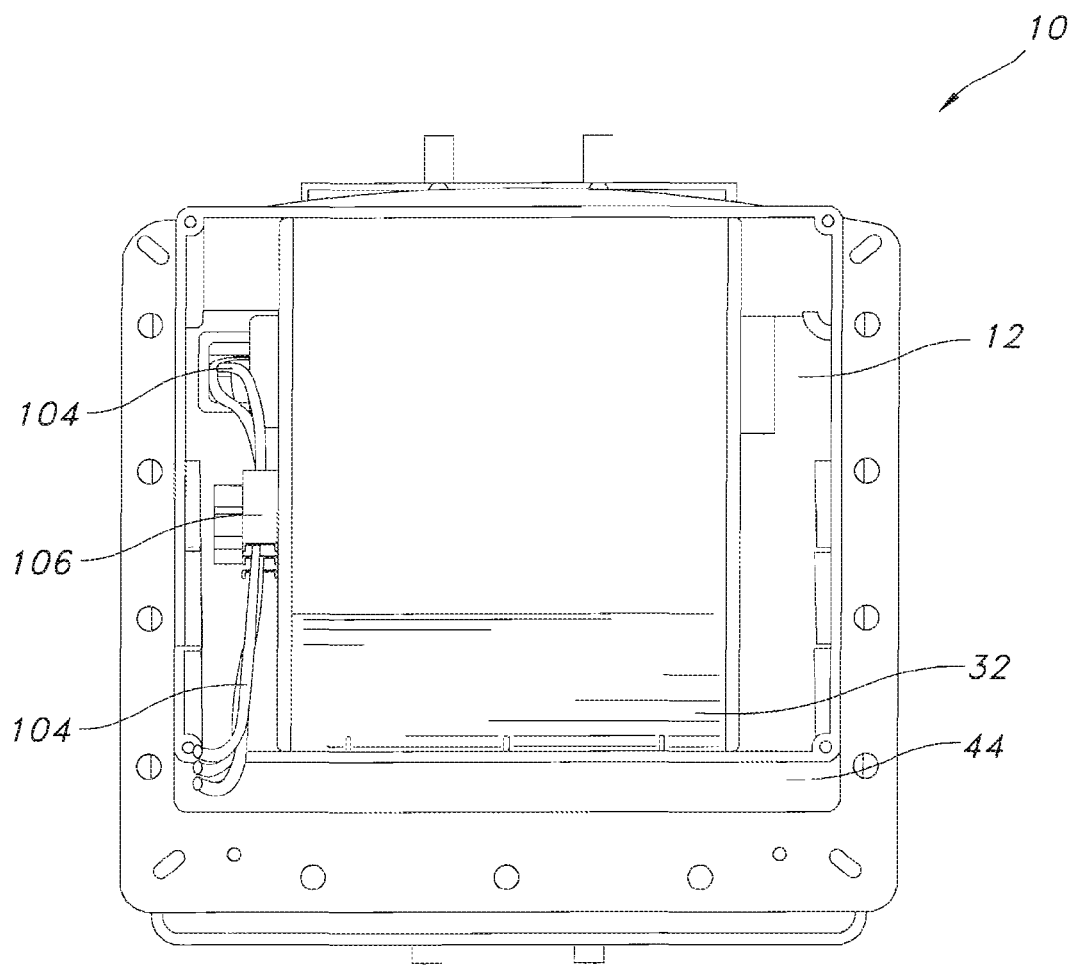
FIG. 5 is a rear perspective view of the interior of the box housing of the box assembly FIG. 1.

FIGS. 2, 3 and 4 show box housing 12 having an interior box housing 34. Interior box housing 34 is defined by a pair of interior side walls 30, an interior back wall 32 and the upper wall 26. One edge of each interior side wall 30 and one edge of interior back wall 32 is attached to upper wall 26 on the lower surface. Interior box is generally a rectangular box like member with a curved back wall 32 which is continuous to form both the back wall and the bottom wall of the interior box 34. The interior side walls 30 include cam receiving openings 37, 39 to provide for pivotable attachment of the cover and an opening for electrical wires to extend therethrough into the cam 14. Interior side wall 30 also includes aperture 31 for cooperatively engaging with cam protrusions and assist in securing the cover in the closed position. The interior side walls 30 are set a distance in from the exterior side walls 22 to provide a back cavity 44 therebetween for terminals and electrical wires to be placed therein.

FIG. 2 shows flange 24 extending about open front 36 of internal cavity 34. Flange 24 extends perpendicularly from side walls 32, 22, lower wall 28 and upper wall 26. Flange 24 is substantially planar with two opposing cam receiving slots 38, 40 for attachment of the cover 14, access to electrical wires and terminals. Flange 14 also includes divot 42 for the wires of a plug to extend therethrough when the cover 14 is in the closed position, see FIG. 3.

FIGS. 2, 3 and 4 show removable back wall 16 which attaches to the back of the box housing 12 to enclose the back cavity 44. The back wall 16 includes a rectangular portion 46 and a lower lip or ridge portion 48 extending perpendicular to the rectangular portion 46. Lower ridge portion 48 is attached to angular planar portion 50. The rectangular portion 46 includes an inset rim 52 which is U-shaped and protrudes perpendicularly outward from the back wall 16. The rim 52 assists with proper positioning and securement of the back wall 16 to the box housing 12. The rectangular portion 46 includes holes which align with the holes of the box housing 12 to provide securement of the back wall 16 to the exterior side walls 22 with fasteners. Angular portion 50 includes knock-outs for power supply lines to extend from the floor or wall into the box assembly 10.

Figure 6:
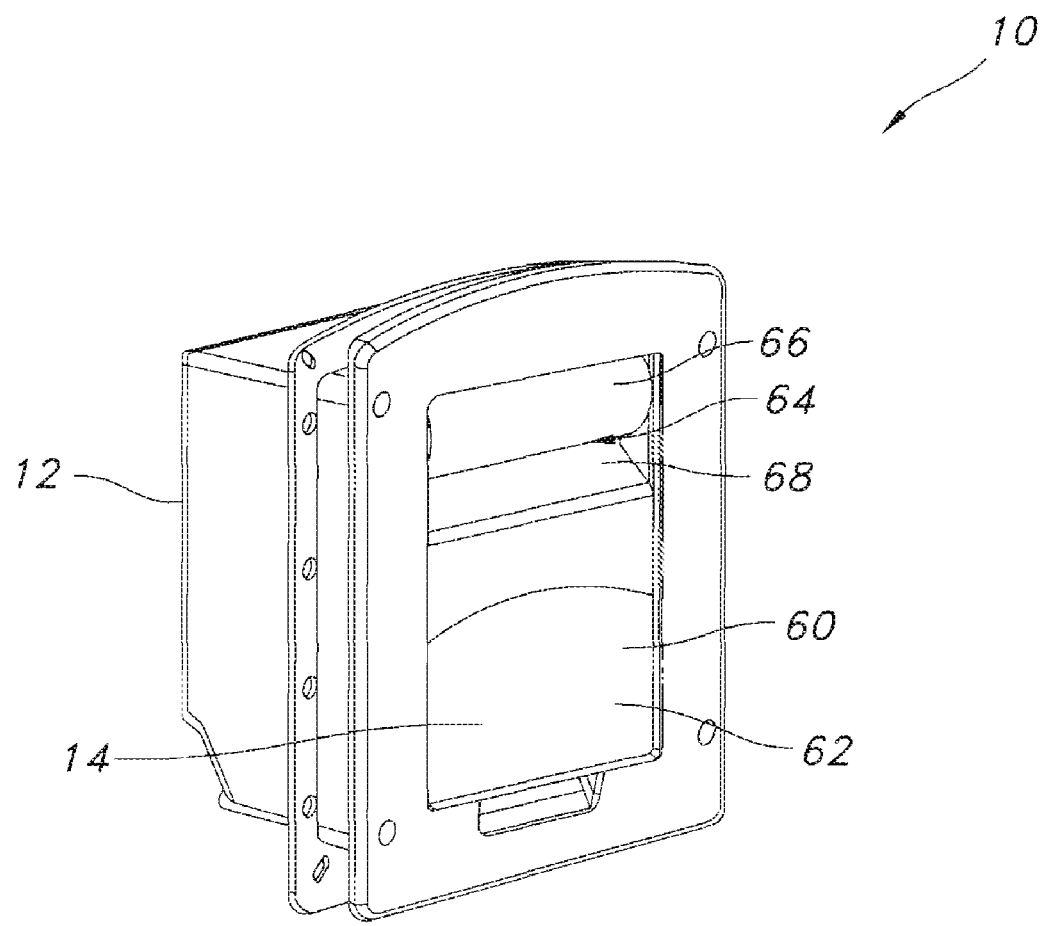
FIG. 6 is a front perspective view of the electrical box assembly of FIG. 1 with the cover in the closed position.

Referring to FIGS. 1-4, pivoting cover 14 has generally rectangular shaped geometry designed to seat inside box interior 34. Cover 14 includes a pair of cover side walls 54, a cover back wall 56, a cover top wall 58 and a cover front wall 60. Cover back wall 56, opposed cover front wall 60 is generally rectangular extending from cover top wall 58 and between cover side walls 54. Cover back wall 56 is shorter in length than cover front wall 60. Cover top wall 58 is generally rectangular and extends between cover side walls 54, and between cover back wall 56 and cover front wall 60. FIGS. 2-4 and 6 show the cover front wall 60. Cover front wall 60 includes a rectangular planar portion 62, a concaved channel 64, and a semi-cylindrical portion 66. The semi-cylindrical portion 66 extends from the top wall 58 in an arc shape forming a half cylindrical across the top of the front cover 60. The semi-cylindrical portion 66 extends between the top wall 58 and the concaved channel 64. The concaved channel 64 is defined by the semi-cylindrical portion 66 and an angled slope 68. The channel 64 extends the width of the cover front wall 60. The channel 64 is concaved having an angle A of less than 90° with respect to the rectangular portion 62 and the semi-cylindrical portion 66. FIG. 4 shows Angle A and the semi-cylindrical portion 66 provides clearance for the cover 14 with respect to the locking flange 20 and box flange 24 when the cover 14 is in the opened position. The angled slope 68 of the concaved channel 64 is attached to the cover rectangular portion 62. The angled slope 68 extends from the cover rectangular portion 62 towards the cover back wall 56 at an angle B which is an obtuse angle. The cover rectangular portion 62 extends from the angled slope 68 of the unattached end 70 of the cover 14, as shown in FIG. 6. Angle B can be increased and angle A can be increased such that the angled slope 68 extends towards the end of the cover at less of an incline which allows for the cover 14 to open wider, at an increasing angle C.

FIG. 2 shows cover side walls 54 which extends between the cover front wall 60 and the cover back wall 56, and the cover top wall 58 and the unattached end 70 of the cover 14. The cover side walls 54 include a concaved divot 72 which corresponds to the cross sectional geometry of the channel of the cover front wall 60. The cover side wall 54 includes a rounded corner portion 74 which corresponds with the geometry of the semi-cylindrical portion 66 front wall cover 60. The rounded corner 74 encircles or surrounds cam 76, such that cam 76 is positioned on the surface of the cover side wall 54 a distance from the edges of the cover side wall 54. Cam 76 is generally a hollow cylindrical shape protruding perpendicular from the cover side wall 54. The cam 76 includes a flange 78 which protrudes outwardly about the end of the cam 76 and the flange 78 is parallel with the cover side wall 54. The cam 76 includes hole 80 therethrough for electrical wires to extend therethrough for access to the receptacle attached inside of the cover 14. Cover side wall 22 includes an angled curved corner 82 diagonal the rounded cover 74. The curved corner 82 is designed to fit within the inner cavity 34 of the box housing 12 and conform with the interior back wall 32. The surface of the cover side walls 54 is generally planar except for the cam 76 and a pair of protrusions 84. Protrusions 84 engage with holes 31 of the interior side walls 30 to hold the cover 54 in a closed position. The cover 14 includes a cover cavity 86 which is defined by the cover side walls 54, cover back wall 56, cover top wall 58, cover front wall 60. The cover cavity 86 provides for attachment of a receptacle 88 therein. The cover cavity 86 provides open space for the plugs to connect to the receptacle and extend within the cover cavity 86. Receptacle 88 is attached at an angle within the cover cavity 86 to allow for easy access to the connections of the receptacle 88. FIGS. 3 and 4 show the receptacle 88 extends from the end of the cover back wall 56 to the end of the angles slope 68.

Box assembly 10 is assembled by attaching the back wall 16 to the box housing 12 using fasteners which secure the back wall 16 by extending through the various holes. A back frame 18 is slid over the exterior surface of the box housing 12 so as to encompass the box housing 12 therein. The back frame 18 abuts the flange 24 of the box housing 24 and secured thereto, as shown in FIG. 3. The back frame 18 is a generally rectangular frame with a rectangular opening 96 in the center. Back frame 18 includes a perpendicularly extending rib 98 which frames the circumference of the back frame opening 96. The rectangular opening 96 is about the size of the cross-section of the exterior dimension of the box housing 12, such that the frame 18 slides over the box housing 12 and the back frame rib 98 is in contact with the box housing 12 exterior surface.

The back frame 18 includes an aperture 100 with raised extensions 102 about the aperture 100. The back frame 18 is attached to the box housing 12 using fasteners which extend through apertures 100 and extensions 102 into holes in the frame 24 of the box housing 12. The raised extensions 102 are approximately the same width as the back frame rib 98. The raised extensions 102 provide spacing between the frame 24 and back frame 18 from a support structure such as a wall, sheet rock, flooring to extend therebetween. The box assembly is recessed into a wall and the back frame secures the box to the wall.

The cover 14 is attached to the box housing 12 by use of cams 76 and cam receiving slots 37, 39. The cams 76 of the cover 14 are placed into the cam receiving slots 37, 39. Then a gasket 90 is placed over cam receiving slot opening 40. Locking flange 20 is placed over cover flange 24 and fasteners are used to secure locking flange 20 to flange 24. Locking flange 20 covers the cam receiving slot 37, 39 and gasket 90 to prevent cams 76 from exiting the slot openings 38, 40. Locking flange 20 is a rectangular strip of planar material which covers the entire inner flange 24. Locking flange 20 includes two inner extending semi-circular prongs 92 for aligning and engaging with the cylindrical portion of cam 76 to secure cover 14 in place. Locking flange 20 is removable and can be replaced if the user wants a different color, texture or material. Additionally, a gasket (not shown) may be placed between flange 24 and locking flange 20. Locking flange 20 includes cut-out 94 which correspond with divot 42 of the inner flange 24 to allow for egress of wires when the cover 14 is in the closed position, as shown in FIG. 3.

Figure 7:
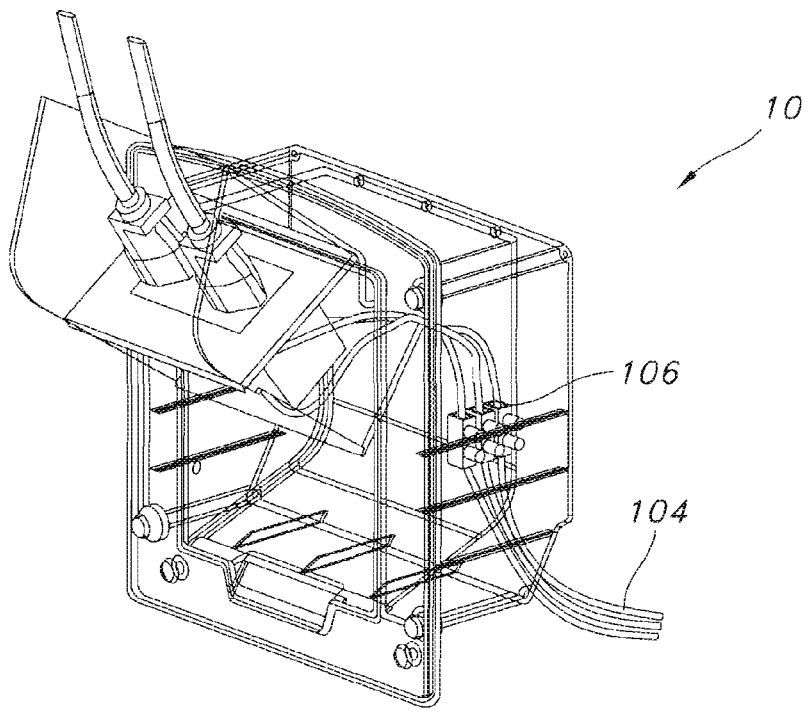
FIG. 7 is a perspective view of the electrical box assembly of FIG. 1 in phantom showing the electrical connections therein.
Figure 8:
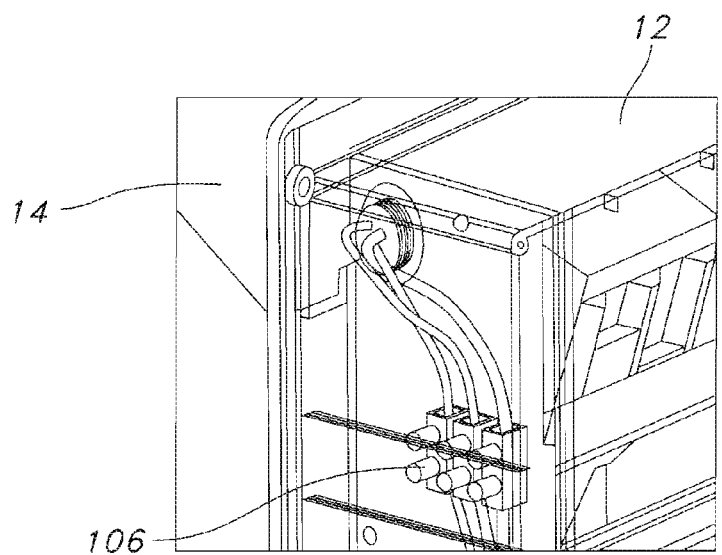
FIG. 8 is a partial perspective view of the electrical box assembly of FIG. 1 showing a portion of the box housing in phantom to show the electrical wiring within the cam.

Prior to securing the back wall 16 to the box housing 12, the electrical wires, switches, terminals and necessary electrical input equipment is placed within the back cavity 44 of the box housing 12. FIGS. 7 and 8 show the input wires 104 entering the cavity 44 and connecting to terminal 106. The wires enter inside the moving cover through the receiving cam opening 39 of the box housing 12 and through hole 80 of cams 76 to the receptacle mounted in the cover 14.

Figure 9:
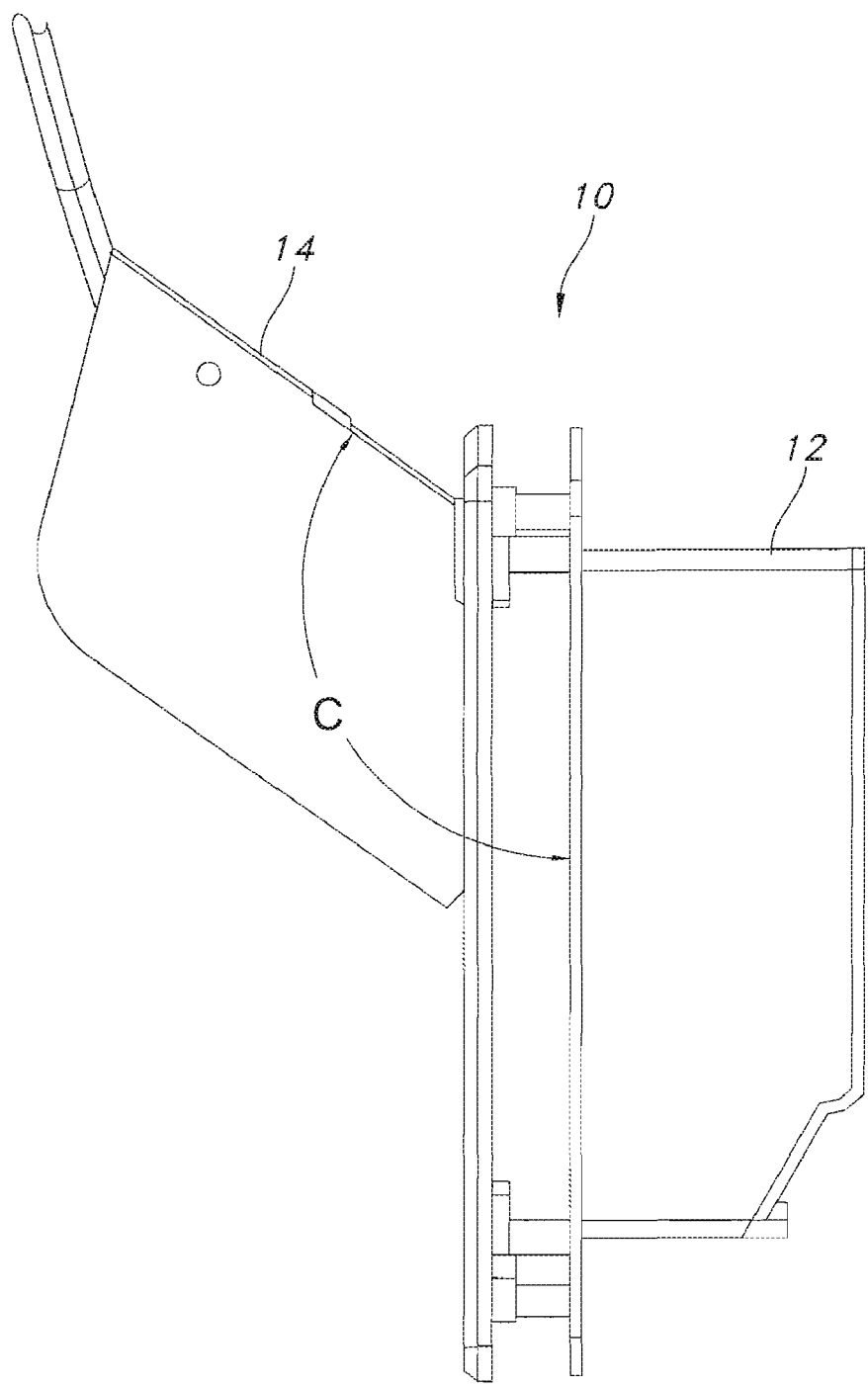
FIG. 9 is a side perspective view of the electrical box assembly of FIG. 1 with the cover in the open position.

FIGS. 1, 2, 4 and 6 show the box assembly 10 completely assembled. FIGS. 4 and 9 show the cover 14 in an opened position. The channel 64 of the cover 14 allows for the cover 14 to open at an obtuse angle C. Angle C opens up to at least about 125°. FIG. 4 shows the channel 64 accommodating for the locking frame 20 and allowing the locking frame 20 to protrude into the cavity of the channel 64. As the cover 14 rotates upwardly increasing the angle C, the semi-cylindrical portion 66 rotates about the axis of the cover 78. The semi-cylindrical portion 66 surrounds the cover 78 and the semi-cylindrical portion 66 enters the interior cavity 34 of the box 12. The cover 14 is fully opened when angle C is at its maximum angle, locking flange 20 enters the cavity of channel 64, angled slope 68 of the cover 14 is in contact with the locking flange 20 and the entire semi-cylindrical portion 66 is within the interior cavity 34 of the box housing 12. Additionally, as the cover 14 is opened, the cover back wall 56 exits the interior cavity 32 of the box housing 12. This rotation of the cover 14 and repositioning of the cover 14 allows for maximum opening and access to the receptacle therein. Additionally, this allows for a flush mount box assembly with maximum opening angle C.

It will be appreciated that the present invention has been described herein with reference to certain preferred or exemplary embodiments. The preferred or exemplary embodiments described herein may be modified, changed, added to or deviated from without departing from the intent, spirit and scope of the present invention. It is intended that all such additions, modifications, amendments and/or deviations be included within the scope of the claims appended hereto.

What is claimed is:

1. An electrical box assembly comprising:
   (a) a box having side walls and an open front face defined by said side walls, said open front face having a flange extending about a perimeter of said open front face, said box having an interior cavity defined by said side walls and said open front face; and
   (b) a rectangular cover pivotally attached to said box, said cover having an open position and a closed position, said cover seats within said interior cavity when said cover is in said closed position, said cover includes a pair of cover side walls, cover back wall, cover top wall and cover front wall, said cover front wall includes a concaved channel therein, each of said pair of cover side walls includes a concaved divot, said concaved channel and said concaved divots provide a cavity for receiving said flange of said box when said cover is in said open position.

2. The electrical box assembly of claim 1 wherein said cover pivots to an open position at an angle of at least 125 degrees with respect to the closed position.

3. The electrical box assembly of claim 1 wherein said cover back wall is shorter than said cover front wall.

4. The electrical box assembly of claim 1 further including a receptacle attached to said cover.

5. The electrical box assembly of claim 1 wherein said cover front wall includes a planar rectangular portion, an angled slope portion attached to said rectangular portion, and a semi-cylindrical portion attached to said angled slope portion.

6. The electrical box assembly of claim 5 wherein said concaved channel is defined by said semi-cylindrical portion and said angled slope portion.

7. The electrical box assembly of claim 6 wherein said concaved channel has an angle of less than about 90 degrees.

8. The electrical box assembly of claim 1 wherein each of said pair of cover side walls includes a cam and said side walls of said box include cam receiving slots for accepting said cam therein.

9. The electrical box assembly of claim 1 wherein said pair of cover side walls include protrusions and said side walls of said box include holes for accepting said protrusions therein to secure said cover within said box when said cover is in the closed position.

10. The electrical box assembly of claim 1 further including a locking frame, said locking frame is attached to said flange of said box to secure said cover to said box.

11. The electrical box assembly of claim 1 wherein said side walls of said box are interior side walls which extend from an upper wall to an interior back wall of said box.

12. The electrical box assembly of claim 11 further including a pair of exterior side walls extending from said upper wall to an exterior lower wall, wherein said pair of exterior side walls are spaced apart from said interior side walls.

13. The electrical box assembly of claim 12 further including an exterior back wall of said box attached to said exterior side walls and extending from said upper wall to said lower wall, wherein said exterior back wall of said box is spaced apart from said interior back wall.

14. The electrical box assembly of claim 13 further including a locking frame, said locking frame is attached to said flange of said box to secure said cover to said box; and a back frame, said back frame is attached to said flange wherein said flange is sandwiched between said back frame and said locking frame.

15. The electrical box assembly of claim 13 further including a back cavity defined by said interior back wall, said exterior back wall, said upper wall, said interior side walls and said exterior side walls.

16. The electrical box assembly of claim 11 wherein said interior back wall extending from said upper wall to said open front face, said interior back wall is curved defining a curved interior back wall.

17. The electrical box assembly of claim 16 wherein said pair of cover side walls includes an angled curved corner which conforms with the curved interior back wall to allow said cover to seat within said interior cavity.

18. An electrical box assembly comprising:
(a) a box having an upper wall, interior side walls, exterior side walls, an interior back wall, an exterior lower wall, an exterior back wall and an open front face, said interior side walls and said exterior side walls are spaced apart and extend from said upper wall, said interior back wall extends from said upper wall, said interior back wall extends between said interior side walls, said exterior back wall extends between said exterior side walls, said exterior back wall extends between said upper wall and said exterior lower wall; said open front face is defined by said interior side walls, said interior back wall and said upper wall; said open front face having a flange extending about a perimeter of said open front face, said box having an interior cavity defined by said interior side walls, said interior back wall, said upper wall and said open front face; and
(b) a rectangular cover pivotally attached to said box, said cover having an open position and a closed position, said cover seats within said interior cavity when said cover is in said closed position, said cover includes a pair of cover side walls, cover back wall, cover top wall and cover front wall, said cover front wall includes a concaved channel therein, each of said pair of cover side walls includes a concaved divot, said concaved channel and said concaved divots provide a cavity for receiving said flange of said box when said cover is in said open position.

19. The electrical box assembly of claim 18 further including a locking frame, said locking frame is attached to said flange of said box to secure said cover to said box; and a back frame, said back frame is attached to said flange wherein said flange is sandwiched between said back frame and said locking frame.

20. The electrical box assembly of claim 19 wherein said pair of cover side walls includes an angled curved corner, said interior back wall is curved to conform with said cover side walls allowing said cover to seat within said interior cavity.

* * * * *